United States Patent
Mayer et al.

(10) Patent No.: US 6,869,643 B1
(45) Date of Patent: Mar. 22, 2005

(54) SELF-PRIMING ARCHITECTURAL COATINGS

(75) Inventors: Hans Mayer, Burghausen (DE); Ingeborg Koenig-Lumer, Burghausen (DE); Albert Hausberger, Kienberg (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 10/377,812

(22) Filed: Mar. 1, 1999

Related U.S. Application Data

(63) Continuation of application No. 08/779,499, filed on Jan. 8, 1997, now abandoned.

(30) Foreign Application Priority Data

Feb. 15, 1996 (DE) .......................................... 196 05 674

(51) Int. Cl.$^7$ ................................................ B05D 3/02
(52) U.S. Cl. .................... 427/387; 427/393.4; 427/393; 524/801; 524/837; 524/263; 524/266; 524/269
(58) Field of Search .............................. 427/387, 393.4, 427/339, 393; 524/801, 837, 263, 266, 269; 106/287.11, 187.13, 287.16

(56) References Cited

U.S. PATENT DOCUMENTS

| 5,051,129 | A | * | 9/1991 | Cuthbert et al. ................ 106/2 |
| 5,091,002 | A | * | 2/1992 | Schamberg et al. ............. 106/2 |
| 5,196,054 | A | * | 3/1993 | Schmuck et al. ............... 106/2 |
| 5,250,106 | A | * | 10/1993 | Roth et al. ...................... 106/2 |
| 5,316,799 | A | * | 5/1994 | Brunken et al. ............. 427/421 |
| 5,443,627 | A | * | 8/1995 | Von Au et al. ................. 106/2 |
| 5,449,712 | A | * | 9/1995 | Gierke et al. ................ 524/266 |
| 5,661,196 | A | * | 8/1997 | Mayer et al. ................ 523/122 |

FOREIGN PATENT DOCUMENTS

| EP | 412515 A1 | * | 2/1991 | ............ B27K/3/34 |
| EP | 606671 A1 | * | 7/1994 | .............. C08J/3/03 |

* cited by examiner

*Primary Examiner*—Tatyana Zalukaeva
(74) *Attorney, Agent, or Firm*—Brooks Kushman P.C.

(57) ABSTRACT

The present invention relates to a process for the coating and water-repellent impregnation of mineral building materials, in which an architectural coating composition containing from 1 to 30 % by weight of $C_1$–$C_{20}$-alkyl-$C_1$–$C_6$-alkoxysilane as impregnating agent is applied to the building material. The principal architectural coating compositions are paints and plasters.

11 Claims, No Drawings

SELF-PRIMING ARCHITECTURAL COATINGS

This application is a continuation of U.S. Ser. No. 08/779,499 filed Jan. 8, 1997, now abandoned.

BACKGROUND OF THE INVENTION

Mineral building materials are best protected against the effects of weathering by a water-repellent impregnation and a coating applied over the latter. As soon as it is coated, a water-repellent impregnation becomes a water-repellent primer.

The primer is applied directly to the mineral substrate. By forming a hydrophobic zone, it renders the substrate water-repellent down to a certain depth and provides permanently improved union between the uniformly hydrophobicized substrate and the architectural coating. Organosilanes, oligomeric organosiloxanes or silicone resins are the best active substances for water-repellent primers.

Solvent-containing and aqueous primer compositions are used. In addition to organosilanes, oligomeric organosiloxanes or silicone resins, solvent-containing primer compositions include synthetic resins, such as styrene acrylates and pure acrylates, which serve to reinforce the substrate.

The advantage of the aqueous primer compositions is that they contain little or no organic solvent fractions. They can be used wherever the substrate is somewhat intact. The highly alkaline aqueous potassium siliconate solutions, microemulsions or emulsions of organosilanes, oligomeric organosiloxanes or silicone resins are used. The hydrophobicizing primer "levels out" the absorbency of the substrate and leads to improved adhesion of the architectural coating and to a water-repellent effect which extends into the depth of the substrate. EP-A-234 024, for example, describes the water-repellent impregnation of building materials with an emulsion of alkyl-alkoxysilanes. U.S. Pat. No. 4,757,106 describes the hydrophobicization of building materials using microemulsions of alkoxy-containing organopolysiloxanes and salts of aminosilicone oils.

The covering architectural coatings are applied in one or more coats over the water-repellent primer. Examples of such architectural coatings are paints and plasters. Pretreating the substrate with a water-repellent primer is important when the architectural coating includes emulsifiers or other wetting agents.

BRIEF SUMMARY OF THE INVENTION

The present invention relates to a process for the coating and water-repellent impregnation of mineral building material, in which a building-material coating composition (architectural coating composition) containing alkylalkoxysilane as impregnating agent is applied to the building material, and also relates to an architectural coating composition containing alkyl-alkoxysilane and optionally alkoxy-containing organopolysiloxane as impregnating agents.

DETAILED DESCRIPTION OF THE INVENTION

The object of the present invention is to provide architectural coating compositions which provide the mineral building material with water-repellent impregnation, so that prior application of a primer is unnecessary.

The invention relates to a process for the coating and water-repellent impregnation of mineral building material, in which an architectural coating composition containing from 1% to 30% by weight of $C_1$–$C_{20}$-alkyl-$C_1$–$C_6$-alkoxysilane as impregnating agent is applied to the building material.

When the water-containing impregnating architectural coating composition is applied, the prior priming operation can be omitted insofar as the intention of priming was to bring about water repellency down to a certain substrate dept. When the water-containing impregnating architectural coating composition is applied, the impregnating agent penetrates well into both dense and porous building materials, and gives the building material properties of water repellency down to a certain depth.

Normally, a coating system consisting of water-repellent primer and topcoat is applied in two or three operations; first, applying the water-repellent primer or optionally, applying the topcoat diluted slightly with water (precoating) and finally applying the undiluted topcoat.

In the present invention, if a precoating is used, the impregnating agent is added to the architectural coating composition which is used for precoating. The precoating to which impregnating agent has been added can also be used as the final coating.

The principal architectural coatings are paints and plasters. The architectural coating compositions suitable for use in the invention are supplied either in dry form, applied in the form of a water-containing formulation, such as powder paints and pulverulent dry plasters, or wet form, such as paste-like water-containing paints, for example silicone resin paints, silicate paints and emulsion paints, or pastelike, water-containing plasters, for example synthetic-resin plasters and silicone resin plasters.

The impregnating architectural coating compositions suitable for the purposes of the present invention can be subdivided according to the thickness in which they are applied; thickly, such as plasters in the millimeter to centimeter range, or thinly, such as covering paints, in the 100 $\mu$ to 1 millimeter range.

The impregnating architectural coating compositions suitable for the purposes of the invention can be used both in the interior of buildings and on the exterior, preferably exterior. Preferred examples are emulsion paints, silicone resin paints, silicone masonry paints, silicate emulsion paints, silicate paints, lime paints, lime emulsion paints, silicate plasters, dry plasters, interior paints, fillers, reinforcing compositions, filling compositions, masonry paints, synthetic-resin plasters, mineral paints, mineral plasters, silicone resin plasters and synthetic-resin-bound coatings.

Preferably, the $C_1$–$C_{20}$-alkyl-$C_1$–$C_6$-alkoxysilanes possess 1 or 2 identical or different, optionally halogen-substituted, SiC-bonded, monovalent $C_1$–$C_{20}$-alkyl radicals, and the other radicals are identical or different $C_1$–$C_6$-alkoxy radicals, especially $C_2$- or $C_3$-alkoxy radicals. The alkyltrialkoxysilanes are preferred, such as octyltriethoxysilane and butyltriethoxysilane.

Examples of $C_1$–$C_6$-alkoxy radicals are the methoxy, ethoxy, n-propoxy, isopropoxy, n-butoxy, isobutoxy, sec-butoxy, tert-butoxy radicals; pentyloxy radicals, such as the n-pentyloxy radical, and hexyloxy radicals, such as the n-hexyloxy radical. The ethoxy radicals are preferred.

Methoxysilanes hydrolyze too quickly for many applications and have a poorer stability on storage than longer alkoxy radicals. $C_4$–$C_6$-alkoxy radicals are too slow to react for many applications.

Examples of the $C_1$–$C_{20}$-alkyl radicals are the methyl, ethyl, n-propyl, isopropyl, n-butyl, isobutyl, tert-butyl, n-pentyl, isopentyl, neopentyl, tertpentyl radical; hexyl radicals, such as the n-hexyl radical; heptyl radicals, such as the n-heptyl radical; octyl radicals, such as the n-octyl radical and isooctyl radicals, such as the 2,2,4-trimethylpentyl radical; nonyl radicals, such as the n-nonyl radical; decyl radicals, such as the n-decyl radical, and dodecyl radials, such as the n-dodecyl radical; cycloalkyl radicals, such as cyclopentyl, cyclohexyl, 4-ethylcyclohexyl, cycloheptyl radicals, norbornyl radicals and methylcyclohexyl radicals.

Examples of halogen-substituted $C_1$–$C_{20}$-alkyl radicals are alkyl radicals substituted by fluorine, chlorine, bromine and iodine atoms, such as the 3,3,3-trifluoro-n-propyl radical, the 2,2,2,2',2',2'-hexafluoroisopropyl radical and the heptafluoroisopropyl radical.

Preference is given to the unsubstituted $C_4$–$C_{12}$-alkyl radicals.

The impregnating agent added to the architectural coating composition may in addition to alkylalkoxysilanes comprise alkoxy-containing organopolysiloxane (A). The organopolysiloxane (A) may additionally contain hydroxyl groups, which facilitate bonding to the building materials.

The alkoxy-containing organopolysiloxane (A) preferably has a viscosity of not more than 2000 mm²/s, in order to achieve good distribution on the pore surfaces in the masonry.

Of particular suitability are the alkoxy-containing organopolysiloxanes (A) comprising units of the formula $$R_x Si(OR^1)_y (OH)_z O_{\frac{4-x-y-z}{2}}, \qquad (I)$$

in which

R represents an identical or different, monovalent, optionally halogen-substituted, SiC-bonded $C_1$–$C_{20}$ hydrocarbon radical, $R^1$ represents an identical or different monovalent $C_1$–$C_6$-alkyl radical, x is 0, 1, 2 or 3, on average from 0.8 to 1.8, y is 0, 1, 2 or 3, on average from 0.01 to 2.0 and z is 0, 1, 2 or 3, on average from 0.0 to 0.5, with the proviso that the sum of x, y and z is not more than 3.5.

The organopolysiloxane (A) has a viscosity of from 10 mm²/s to 50,000 mm²/s, preferably from 50 mm²/s to 5000 mm²/s, at 25° C.

Examples of the $C_1$–$C_{20}$ hydrocarbon radicals are the $C_1$–$C_{20}$ alkyl radicals and halogen-substituted $C_1$–$C_{20}$-alkyl radicals listed above in connection with the alkylalkoxysilanes, and the alkenyl radicals, such as the vinyl, allyl, n-5-hexenyl, 4-vinylcyclohexyl and 3-norbornenyl radical; aryl radicals, such as the phenyl, biphenylyl, naphthyl and anthryl and phenanthryl radicals; alkaryl radicals, such as o-, m-, p-tolyl radicals, xylyl radicals and ethlphenyl radicals; aralkyl radicals, such as the benzyl radical, the α- and β-phenylethyl radical. The unsubstituted $C_1$–$C_{12}$-alkyl radicals and the phenyl radical are preferred.

Although not indicated in the formula given above, some of the radicals R can be replaced by hydrogen atoms attached directly to silicon atoms however, this is not preferred.

Examples of the radicals $R^1$ are the methyl, ethyl, n-propyl, isopropyl, n-butyl sec-butyl and tert-butyl radical; pentyl radicals, such as the n-pentyl radical and hexyl radicals, such as the n-hexyl radical, the ethyl radicals being preferred.

Preferably x has an average value of from 0.9 to 1.1. y has an average value of from 0.4 to 1.2, and z has an average value of from 0.0 to 0.2.

Examples of the alkoxy-containing organopolysiloxane (A) are those obtainable by reacting methyltrichlorosilane and, optionally, a $C_1$–$C_8$-alkyltrichlorosilane, or phenyltrichlorosilane, with ethanol in water, such as the organopolysiloxanes of the empirical formula $CH_3Si(OC_2H_5)_{0.8}O_{1.1}$ or $C_6H_5Si(OC_2H_5)_{0.72}O_{1.14}$.

The impregnating agent added to the architectural coating composition may, in addition to alkylalkoxysilanes, include organopolysiloxane (B) as well, which in addition to other organosiloxane units includes those siloxane units having SiC-bonded radicals containing basic nitrogen with the proviso that the amine number of the organopolysiloxane is at least 0.01.

The organopolysiloxanes (B) are preferably those comprising units of the formula $$R_a^2 R_b^3 (OR^4)_c SiO_{\frac{4-a-b-c}{2}}, \qquad (II)$$

in which $R^2$ represents an identical or different, monovalent optionally halogen-substituted, SiC-bonded $C_1$–$C_{20}$ hydrocarbon radical devoid of basic nitrogen, $R^3$ represents an identical or different, monovalent, optionally halogen-substituted, SiC-bonded $C_1$–$C_{30}$ hydrocarbon radical containing basic nitrogen, R4 is identical or different at each occurrence and represents a hydrogen atom or $C_1$–$C_6$ alkyl radical, a is 0, 1, 2 or 3, b is 0, 1, 2 or 3, on average at least 0.05, and c is 0, 1, 2 or 3, with the proviso that the sum of a, b and c is less than or equal to 3 and that the amine number of the organopolysiloxane (B) is at least 0.01.

The amine number designates the number of ml of 1 N HCl required to neutralize 1 g of organopolysiloxane (B). The amine number of the organopolysiloxane (B) is at least 0.1, preferably at least 0.2, and more preferably not more than 8, in particular not more than 4.

Examples and preferred examples of the radical $R^2$ are listed above for radical R. The methyl and the isooctyl radical are preferred.

Each silicon atom to which a hydrogen atom is attached also carries a hydrocarbon radical, especially a methyl radical.

Radical $R^3$ is preferably a radical of the formula $$R^5{}_2 NR^6— \qquad (III),$$

in which $R^5$ is identical or different and represents hydrogen or monovalent, optionally substituted $C_1$–$C_{10}$ hydrocarbon radical or $C_1$–$C_{10}$ amino hydrocarbon radical, and $R^6$ represents a divalent $C_1$–$C_{15}$ hydrocarbon radical.

Examples of radical $R^5$ are hydrocarbon radicals given for radical R, and amino-substituted hydrocarbon radicals, such as aminoalkyl radicals, in which context the aminoethyl radical is preferred.

Each nitrogen atom in the radicals of formula (III) preferably carries at least one hydrogen atom.

Radical $R^6$ comprises divalent hydrocarbon radicals having 1 to 10 carbon atoms, preferably 1 to 4 carbon atoms, and more preferably the n-propylene radical.

Examples of radical $R^6$ are the methylene, ethylene, propylene, butylene, cyclohexylene, octadecylene, phenylene and butenylene radical.

Preferred examples of radicals $R^3$ are $H_2N(CH_2)_3$—, $H_2N(CH_2)_2NH(CH_2)_r$—, $H_2N(CH_2)_2NH(CH_2)_3$—, $H_2N(CH_2)_2$—, $H_3CNH(CH_2)_3$—, $C_2H_5NH(CH_2)_3$—,
$H_3CNH(CH_2)_2$—,
$C_2H_5NH(CH_2)_2$—,
$H_2N(CH_2)_4$—,
$H_2N(CH_2)_5$—,
$H(NHCH_2CH_2)_3$—,
$C_4H_9NH(CH_2)_2NH(CH_2)_2$—,
cyclo-$C_6H_{11}NH(CH_2)_3$—,
cyclo-$C_6H_{11}NH(CH_2)_2$—,
$(CH_3)_2N(CH_2)_3$—,
$(CH_3)_2N(CH_2)_2$—,
$(C_2H_5)_2N(CH_2)_3$— and
$(C_2H_5)_2N(CH_2)_2$.

The examples of alkyl radicals $R^1$ also apply to radical $R^6$.

Examples and preferred examples of the radical $R^4$ are listed above for radical $R^1$. The methyl and the ethyl radical are preferred.

The average value for a is from 0 to 2, preferably from 0 to 1.8.

The average value for b is from 0.1 to 0.6, preferably from 0.15 to 0.30.

The average value for c is from 0 to 0.8, preferably from 0.01 to 0.6.

The organopolysiloxanes (B) have a viscosity of from 5 to 5000, preferably from 100 to 3000 mm$^2$/s at 25° C.

Organopolysiloxanes (B) can be prepared, for example by equilibrating or condensing amino-functional silanes with organopolysiloxanes which contain alkoxy groups and/or hydroxyl groups and are free from basic nitrogen.

The water-containing impregnating architectural coating composition contains from 3% to 25% by weight, preferably from 8% to 20% by weight, of the impregnating agent.

The proportion of optionally used organopolysiloxane (A) and organopolysiloxane (B) together is preferably not more than 60% by weight of the impregnating agent.

The addition of impregnating agent can be carried out directly before application of the coating, or in-plant while still at the premises of the coating-composition manufacturer.

The impregnating agent is added either as an aqueous emulsion or in pure form to the architectural coating composition. For example, the impregnating agent is incorporated during the preparation of the architectural coating position, in order to obtain the water-containing impregnating architectural coating composition.

If the impregnating agent is added as an aqueous emulsion or in pure form to the architectural coating composition, particularly suitable anionic emulsifiers are:

1. Alkyl sulfates, especially those having a chain length of 8 to 18 carbon atoms, alkyl and alkaryl ether sulfates having 8 to 18 carbon atoms in the hydrophobic radical and 1 to 40 ethylene oxide (EO) and/or propylene oxide (PO) units.
2. Sulfonates, especially alkylsulfonates having 8 to 18 carbon atoms, alkylarylsulfonates having 8 to 18 carbon atoms, taurides, esters and monoesters of sulfosuccinic acid with monohydric alcohols or alkylphenols having 4 to 15 carbon atoms; optionally, these alcohols or alkylphenols may also be ethoxylated with 1 to 40 EO units.
3. Alkali metal and ammonium salts of carboxylic acids having 8 to 20 carbon atoms in the alkyl aryl, alkaryl or aralkyl radical.
4. Phosphoric acid partial esters and their alkali metal and ammonium salts, especially alkyl and alkaryl phosphates having 8 to 20 carbon atoms in the organic radical, alkyl ether phosphates and alkaryl ether phosphates having 8 to 20 carbon atoms in the alkyl or alkaryl radical and 1 to 40 EO units.

Particularly suitable nonionic emulsifiers are:

5. Polyvinyl alcohol still containing from 5% to 50%, preferably from 8% to 20% of vinyl acetate units, and having a degree of polymerization of from 500 to 3000.
6. Alkyl polyglycol ethers, preferably those having 8 to 40 EO units and alkyl radicals of 8 to 20 carbon atoms.
7. Alkylaryl polyglycol ethers, preferably those having 8 to 40 EO units and 8 to 20 carbon atoms in the alkyl and aryl radicals.
8. Ethylene oxide/propylene oxide (EO/PO) block copolymers, preferably those having 8 to 40 EO and PO units.
9. Addition products of alkylamine having alkyl radicals of 8 to 22 carbon atoms with ethylene oxide or propylene oxide.
10. Fatty acids having 6 to 24 carbon atoms.
11. Alkyl polyglycosides of the formula $R^*$—O—$Z_o$ in which $R^*$ is a linear or branched, saturated or unsaturated alkyl radical having on average 8–24 carbon atoms and $Z_o$ is an oligoglycoside radical having on average o=1–10 hexose or pentose units, or mixtures thereof.
12. Natural substances and derivatives thereof, such as lecithin, lanolin, saponins, cellulose, cellulose alkyl ethers and carboxy alkyl celluloses, whose alkyl groups each have up to 4 carbon atoms.
13. Linear organo(poly)siloxanes containing polar groups, especially those containing alkoxy groups of up to 24 carbon atoms and/or up to 40 EO and/or PO groups.

Particularly suitable cationic emulsifiers are:

14. Salts of primary, secondary and tertiary fatty amines having 8 to 24 carbon atoms with acetic acid, sulfuric acid, hydrochloric acid and phosphoric acids.
15. Quarternary alkyl- and alkylbenzeneammonium salts, especially those whose alkyl groups have 6 to 24 carbon atoms, in particular the halides, sulfates, phosphates and acetates.
16. Alkylpyridinium, alkylimidazolinium and alkyloxazolinium salts, especially those whose alkyl chain has up to 18 carbon atoms, especially the halides, sulfates, phosphates and acetates.

Particularly suitable ampholytic emulsifiers are:

17. Amino acids with long-chain constituents, such as N-alkyl-di-(aminoethyl)glycine or N-alkyl-2-aminopropionic acid salts.
18. Betaines, such as N-(3-acylamidopropyl)-N,N-dimethylammonium salts having a $C_8$–$C_{18}$-acyl radical, and alkyl-imidazolium betaines.

Preferred emulsifiers are nonionic emulsifiers, especially the addition products of alkylamines with ethylene oxide or propylene oxide as listed above under 9, the alkyl polyglycosides listed above under 11., and the polyvinyl alcohol listed above under 5. Polyvinyl alcohols still contain from 5% to 20%, preferably from 10% to 15%, of vinyl acetate units and have a degree of polymerization of from 500 to 3000, preferably from 1200 to 2000.

The proportion of emulsifier is from 1% to 30% by weight preferably from 2% to 10% by weight based on the overall quantity of the impregnating agent.

The water-containing impregnating architectural coating composition may also comprise buffer substances which stabilize the pH in the range from 5 to 8, in which the impregnating agent is very stable to hydrolysis. Suitable substances are all organic and inorganic acids and bases which are chemically inert to the other constituents of the architectural coating composition, and are in particular the alkali metal, alkaline earth metal and ammonium salts of carboxylic acids, phosphoric acid, carbonic acid and sulfuric acid. Preference is given to sodium carbonate, sodium bicarbonate, sodium hydrogen phosphate, and a mixture of acetic acid and aqueous ammonia solution. The quantity of buffer substances is preferably not more than 3% by weight, preferably 1% by weight of the overall quantity of the water-containing impregnating architectural coating compositions.

In addition to the above-described constituents, the water-containing impregnating architectural coating compositions may additionally comprise additives, such as fungicides, bactericides, algicides, microbicides, odor substances, corrosion inhibitors and antifoams. The quantity of additives is not more than 2% by weight, preferably 0.5% by weight, of the overall quantity of the water-containing impregnating architectural coating compositions.

The invention also relates to an architectural coating composition for mineral building materials, which contains from 1% to 30% by weight of $C_1$–$C_{20}$-alkyl-$C_1$–$C_6$-alkoxysilane and optionally alkoxy-containing organopolysiloxane (A) as impregnating agents.

In the examples which follow all parts and percentages, unless stated otherwise, are by weight. Unless indicated otherwise, the following examples are carried out at the pressure of the surrounding atmosphere, at about 0.10 MPa, and at room temperature, at about 20° C., or at the temperature which is established when the reactants are combined at room temperature without additional heating or cooling. All viscosities indicated in the examples relate to a temperature of 25° C. The solids content of the emulsions signifies the sum of all components with the exception of water.

EXAMPLE 1

Silicone resin paint (Comparison Example)

To prepare aqueous architectural coatings, the following components are mixed in the sequence given in a commercial high-speed stirrer apparatus:

| | |
|---|---|
| 336 parts by weight | of water |
| 1 part by weight | of pigment-dispersing agent |
| 2 parts by weight | of fungicide |
| 5 parts by weight | of thickener based on cellulose ether |
| 120 parts by weight | of titanium dioxide |
| 275 parts by weight | of chalk |
| 60 parts by weight | of talc |
| 95 parts by weight | of an about 54% strength by weight aqueous silicone resin emulsion consisting of 90 mole % $CH_3SiO_{3/2}$ units, 20 mole % $(CH_3)_2SiO_{2/2}$ units and 10 mole % $C_2H_5OSiO_{3/2}$ units. |
| 10 parts by weight | of a 55% strength by weight aqueous emulsion of a condensation product of an α,ω-dihydroxymethylpolysiloxane having an Si-bonded hydroxyl group in each of the terminal units and N-(2-aminoethyl)-3-aminopropyltrimethoxysilane in the presence of KOH, having an amine number of about 0.3, a viscosity of about 1500 mm²/s at 25° C. and a residual methoxy content of less than 5 mole %, based on the methoxy groups initially present in the N-(2-aminoethyl)-3-aminopropyltrimethoxysilane |
| 1 part by weight | of ammonia solution |
| 95 parts by weight | of an approximately 50% strength by weight polymer dispersion based on styrene acrylate (Acronal ® 290 D from BASF AG, Germany) |
| to give: 1000 parts by weight of silicone resin paint | |

Lime sandstone is coated with 200 g/m² of this silicone resin paint using a brush. After storage of the coated substrate for 14 days at room temperature under standard conditions, the adhesive strength according to DIN ISO 4624 and the thickness of the hydrophobic zone (depth of penetration) underneath the coating are determined. The latter is determined by breaking the substrate and wetting the fracture site with water.

The following values are obtained:

Depth of penetration: 0 mm

Adhesive strength: 1.50 N/mm².

EXAMPLE 2

Silane emulsion EM 8, in the quantities indicated in Table 1, is added to the silicone resin paint (SRP) prepared according to Example 1, by stirring it in.

Preparation of the silane emulsion EM 8: 54 parts by weight of iso-octyltriethoxysilane are emulsified with 6 parts by weight of the condensation product of an α,ω-dihydroxyethylpolysiloxane having one Si-bonded hydroxyl group in each of the terminal units and N-(2-aminoethyl)-3-aminopropyltrimethoxysilane in the presence of KOH, having an amine number of about 0.3, a viscosity of about 1500 mm²/s at 25° C. and a residual methoxy content of less than 5 mole %, based on the methoxy groups initially present in the N-(2-aminoethyl)-aminopropyltrimethoxysilane, 0.5 part by weight of a reaction product of stearylamine and ethylene oxide (Genamin® 200 from Hoechst AG, Frankfurt), 2.7 parts by weight of a fatty alcohol C8–C10-glycoside in aqueous solution (Glukopon® 225 from Henkel KGaA, Düsseldorf), and 36.8 parts by weight of water. The aqueous emulsions are prepared by first of all mixing some of the water with emulsifier and emulsifying amino-functional polysiloxane followed by silane. Both the initially mentioned mixing and the emulsification are carried out in a high-speed stator-rotor stirrer device according to Prof. P. Willems.

The self-priming silicone resin paint obtained is applied to lime sandstone, the substrate is stored and the penetration depth and adhesive strength are determined in accordance with Example 1, giving the values listed in Table 1 below:

TABLE 1

| Example | Addition of EM 8 to 100 g of SRP | Quantity of SRP applied | Depth of penetration | Adhesive strength |
|---|---|---|---|---|
| a) | 2 g | 204 g/m² | 0.1 mm | 1.90 N/mm² |
| b) | 10 g | 220 g/m² | 0.5 mm | *2.86 N/mm² |
| c) | 20 g | 240 g/m² | 1.5 mm | *2.94 N/mm² |
| d) | 30 g | 260 g/m² | 2.0 mm | *2.90 N/mm² |
| e) | 50 g | 300 g/m² | 2.5 mm | *2.82 N/mm² |
| f) | **20 g | 240 g/m² | 1.5 mm | *2.90 N/mm² |

*Stone removal cracks are found; adhesive strength is greater than the intrinsic strength of the lime sandstone.
**Addition of 20 g of EM 8 to 100 g of silicone resin paint followed by storage of the mixture at room temperature for 4 months before application to lime sandstone

EXAMPLE 3

Comparison Example

The silane emulsion EM 8 is used alone as primer composition. For this purpose it is diluted 1:9 with water. Lime sandstone substrates are treated with this EM 8 dilution in accordance with Example 1, they are stored, and the depth of penetration is determined.

The values obtained are indicated in Table 2 below:

TABLE 2

| Example 3 | Quantity applied | Depth of penetration |
|---|---|---|
| a) | 40 g/m² | 0.2 mm |
| b) | 200 g/m² | 1.0 mm |

TABLE 2-continued

| Example 3 | Quantity applied | Depth of penetration |
|---|---|---|
| c) | 400 g/m² | 2.0 mm |
| d) | 600 g/m² | 2.5 mm |
| e) | 1000 g/m² | 3.0 mm |

EXAMPLE 4

Isooctyltriethoxysilane is added during the preparation of the silicone resin paint in order to obtain a self-priming silicone resin paint. To prepare aqueous architectural coatings, the following components are mixed in the sequence given in a commercial high-speed stirrer apparatus:

| | |
|---|---|
| 53 parts by weight | of an approximately 55% strength by weight aqueous emulsion of the condensation product described in Example 2 in connection with the preparation of silane emulsion EM 8 |
| 8 parts by weight | of a fatty alcohol $C_8$–$C_{10}$ glycoside in aqueous solution (Glukopon ® 225 from Henkel KGaA, Düsseldorf) |
| 106 parts by weight | of isooctyltriethoxysilane |
| 379 parts by weight | of water |
| 1 part by weight | of pigment-dispersing agent |
| 2 parts by weight | of fungicide |
| 5 parts by weight | of thickener based on cellulose ether |
| 120 parts by weight | of titanium dioxide |
| 275 parts by weight | of chalk |
| 60 parts by weight | of talc |
| 95 parts by weight | of an about 54% strength by weight aqueous silicone resin emulsion consisting of $CH_3SiO_{3/2}$ units, with about 20 mole % $(CH_3)_2SiO_{2/2}$ units and about 10 mole % $C_2H_5OSiO_{3/2}$ units. |
| 1 part by weight | of ammonia solution |
| 95 parts by weight | of an approximately 50% strength by weight polymer dispersion based on styrene acrylate (Acronal ® 290 D from BASF AG, Germany) | to give: 1200 parts by weight of silicone resin paint

Lime sandstone is coated with 240 g/m² of this self-priming silicone resin paint using a brush, and, as described in Example 1, the coated substrate is stored and the penetration depth and adhesive strength are determined.

The following values were obtained:
Depth of penetration: 1.5 mm
Adhesive strength: 2.75 N/mm².

EXAMPLE 5

Comparison Example 20 g of isooctyltriethoxysilane are mixed with 180 g of aliphatic solvent (white spirit). Lime sandstone is treated with this mixture in accordance with Example 1 by brush application (200 g/m²), the substrate is stored and the depth of penetration is determined.

The following value is obtained: Depth of penetration: 1.5 mm.

EXAMPLE 6

The silicone resin paint prepared in accordance with Example 1 and a commercial masonry emulsion paint based on acrylate polymer (Maxicryl® from Sto AG, Stühlingen, Germany) are each mixed with 20% by weight of the following silane emulsions Nos. 1 to 4, or water. The resulting self-priming architectural coatings are applied to lime sandstone, stored and then evaluated in respect of determining the depth of penetration.

Silane emulsions Nos. 1 to 4:

No. 1: A mixture of 100 g of polysiloxanediol with a molecular weight of 6803 g/mol and 32.5 g of γ-aminopropyltriethoxysilane is heated to 180° C., during which it is stirred and nitrogen is passed through, and is held at this temperature for about 4 hours until 8.8 g of ethanol have been expelled. The resulting product is then cooled. 125 g of this product are mixed with 125 g of isobutyltrimethoxysilane. To this formulation there are added 20 g of an emulsifier mixture consisting of a methylpolyoxyethylene (15)cocoammonium chloride in a weight ratio of 1:1 and, following the addition of 335 g of water, the formulation is processed to form an emulsion using an apparatus which operates in accordance with the rotor/stator principle. The isobutyltrimethoxysilane content of the emulsion is 40% by weight.

No. 2: 10 g of n-octyltriethoxysilane and 1.5 g of sorbitol monooctadecanoate are stirred vigorously with a magnetic stirrer, and 38.5 g of water are added over the course of 5 minutes. The n-octyltriethoxysilane content of the emulsion is 20% by weight.

No. 3: 58.4 g of water, 1.25 g of surfactant of the formula $H_3C$—$(CH_2)_u$—$CH$=$CH$—$(CH_2)_u$—$(OCH_2$—$CH_2)_3$—$O$—$Si(OC_2H_5)_2$—$(CH_2)_u$—$CH_3$ where u=6–10 and 0.35 g of sodium octylsulfonate are combined with stirring. 40 g of n-octyltriethoxysilane are stirred into this mixture, which is then adjusted to a pH of 7.5 with sodium bicarbonate. The n-octyltriethoxy-silane content of the emulsion is 40% by weight No. 4: 61.81 g of a mixture of 0.97 part by weight of n-octyltriethoxy-silane and 1 part by weight of a resin of average formula $(CH_3)_00.8(C_{12}H_{25})_{0.2}Si(O)_1(OCH_3)_1$ are dispersed twice with 1 g of a mixture of an ethylene oxide adduct of a fatty alcohol and of a polyethylene oxide sorbitan laurate, having an HLB value of 15, in the presence of 0.1 g of ethanolamine and 37.1 g of water in a jet disperser with 2 serial nozzles at 200 bar. The mean particle size is 0.834 μm. The amount of impregnating agent in the emulsion is 60% by weight.

The results are listed in Table 3 below:

TABLE 3

| | Added silane | Depth of penetration | |
|---|---|---|---|
| Example 6* | emulsion | Emulsion paint | SRP Example 1 |
| a) | No. 1 | —** | 1 mm |
| b) | No. 2 | —** | 0.5 mm |
| c) | No. 3 | 0.5 mm | 0.5 mm |
| d) | No. 4 | 0.5 mm | 0.5 |
| e) Comparison | Water | 0 mm | 0 mm |

*Quantity of the self-priming coating applied to lime sandstone: 240 g/m². Addition of the silane emulsions Nos. 1 to 4 or addition of water to 100 g of architectural coating: 20 g
**not determined.

EXAMPLE 7

30 g of EM 8 from Example 2 are stirred into 100 g of the acrylate-based masonry emulsion paint of Example 6. The resulting self-priming emulsion paint is applied to lime sandstone and following storage of the substrate shows the following values in accordance with Example 1:

Depth of penetration: 0.5 mm

Adhesive strength: 2.60 N/mm$^2$.

Without the addition of EM 8, the coating has the following values:

Depth of penetration: 0 mm

Adhesive strength: 2.15 N/mm$^2$.

EXAMPLE 8

The procedure of Example 7 is repeated. However, 30 g of EM 8 are stirred into 100 g of a silicate emulsion paint (ISPO®-Silikatfarbe from Ispo GmbH, Kriftel). The following depth of penetration of the self-priming silicate emulsion paint is found: 1.5 mm. Without the addition of EM8 the depth of penetration is 0 mm.

What is claimed is:

1. A process for the simultaneous coating and water-repellant impregnation of mineral building material, comprising applying in a wet thickness of at least 100 µm to the mineral building material an architectural coating composition containing from 1% to 30% by weight of $C_1$–$C_{20}$-alkyl-$C_2$–$C_3$— alkoxysilane impregnating agent, where the percent weight of the impregnating agent is based on the total weight of the architectural coating composition including the impregnating agent, wherein said mineral building material is rendered hydrophobic by incorporation of alkoxysilane impregnating agent from said architectural coating into the mineral building material surface adjoining the architectural coating.

2. The process as claimed in claim 1, wherein the architectural coating composition is selected from the group consisting of paints and plasters.

3. The process as claimed in claim 1, wherein the $C_1$–$C_{20}$-alkyl-$C_2$–$C_3$-alkoxysilanes has 1 or 2 identical or different, optionally halogen-substituted SiC-bonded, monovalent $C_1$–$C_{20}$-alkyl radicals, and the remainder of the radicals presented are identical or different $C_2$–$C_3$-alkoxy radicals.

4. The process as claimed in claim 1, wherein the impregnating agent further comprises an alkoxy-containing organopolysiloxane (A).

5. The process of claim 1, wherein the architectural coating is a paste which can be applied to the mineral building material in a thickness of at least 1 mm.

6. The process of claim 1, wherein said architectural coating further comprises at least one aminoalkyl-functional organosiloxane having an amine number of at least 0.01.

7. The process of claim 6, wherein said aminoalkyl-functional organosiloxane has an amine number of from 0.1 to 8.

8. The process of claim 6, wherein said architectural coating is a paste containing one or more fillers selected from the group consisting of limestone, chalk, talc, and redispersible polymer powder.

9. The process of claim 1, wherein the architectural coating is a plaster or a filling composition.

10. The process of claim 1, wherein the architectural coating is a synthetic resin-bound coating.

11. The process of claim 1, wherein the architectural coating is a lime paint or a lime emulsion paint.

* * * * *